United States Patent [19]

Keich et al.

[11] 3,781,055
[45] Dec. 25, 1973

[54] RELEASABLE COUPLING

[75] Inventors: John D. Keich, Mountain View, Calif.; George A. Laliberte, Hudson, Mass.

[73] Assignee: The United States of America as represented by the Secretary of the Army, Washington, D.C.

[22] Filed: July 14, 1972

[21] Appl. No.: 271,954

[52] U.S. Cl. ............................ 294/83 A, 244/137 R
[51] Int. Cl. ............................................ B64d 17/38
[58] Field of Search............. 294/82 R, 83 R, 83 AB, 294/83 AE, 84, 74, 75, 76, 83 A; 244/137 R, 151 B

[56] References Cited
UNITED STATES PATENTS
3,425,739  2/1969  Frost ................................. 294/83 R Primary Examiner—Evon C. Blunk
Assistant Examiner—James L. Rowland
Attorney—Harry M. Saragovitz et al.

[57] ABSTRACT

An improved releasable coupling for releasably connecting the elements of a system under tension load, as in a system for extracting a heavy cargo from an aircraft. The improvement comprises a reciprocative toggle linkage for releasably locking a latch element in engagement with a rotatable cam in a link assembly, and a roller bearing locking means for releasably locking the toggle linkage until it is purposely unlocked by withdrawing the roller bearing locking means from engagement with a rotatable lock link of the toggle linkage. When unlocking of the releasable coupling occurs, the high energy stored in the system is dissipated through bearing friction and air resistance on the rotating lock link together with the reciprocative but non-impacting action of the latch and the connecting rod which connects the latch to the lock link. Thus damage to the inner parts of the latch assembly of the releasable coupling is minimized since the impacting of internal parts occurring in prior releasable couplings is eliminated.

7 Claims, 7 Drawing Figures

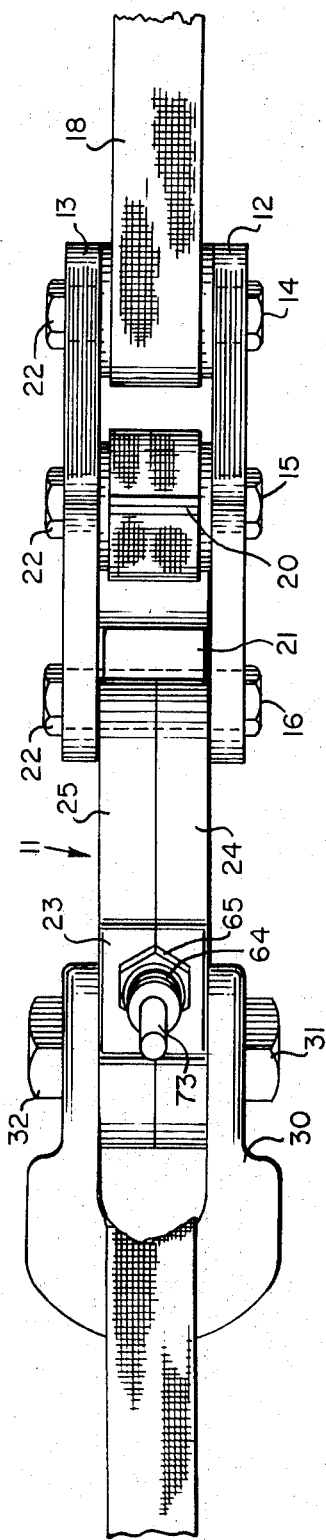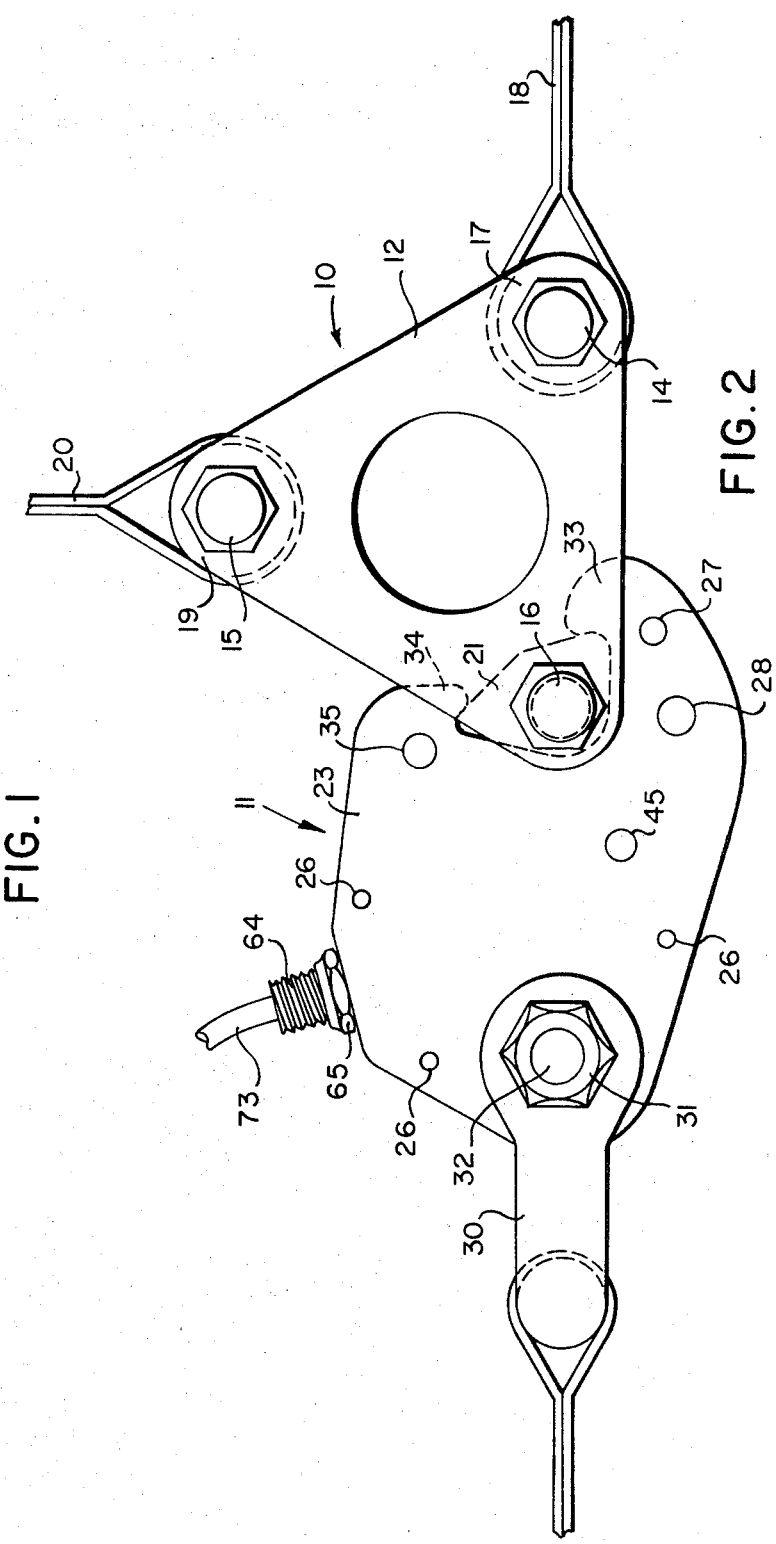

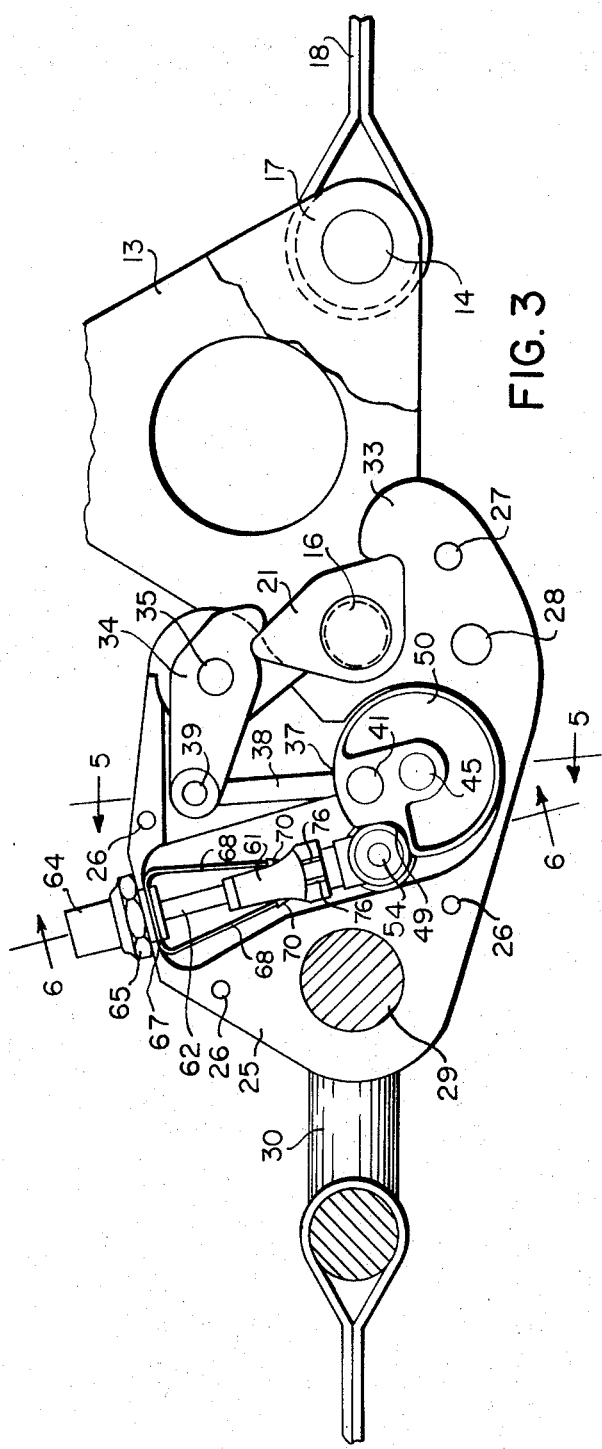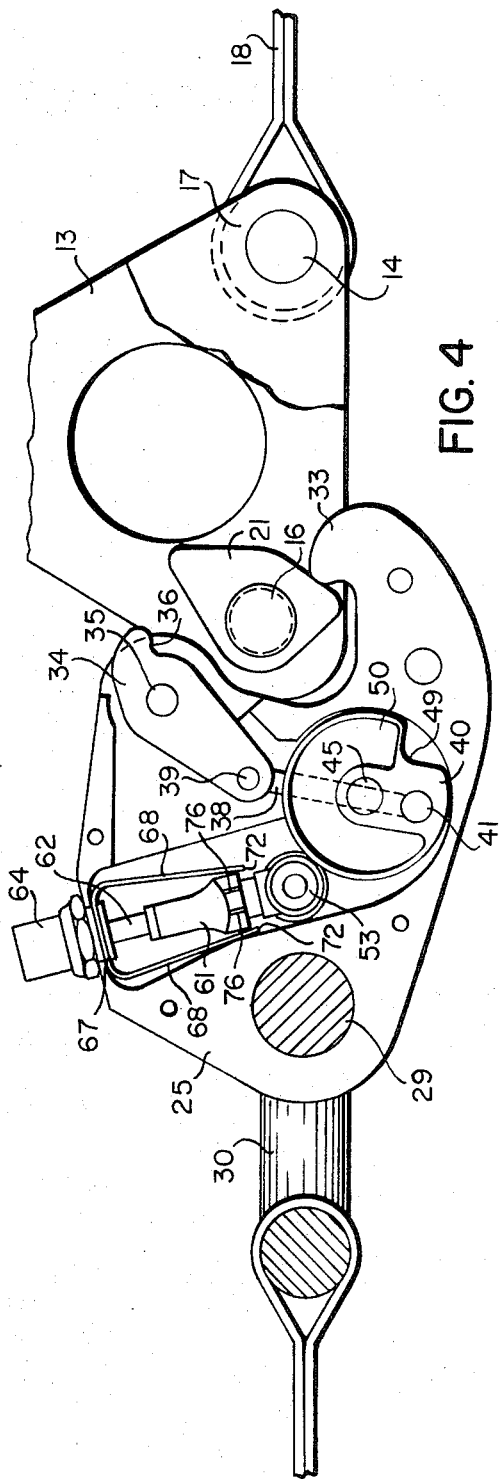
FIG. 3
FIG. 4

RELEASABLE COUPLING

The invention described herein may be manufactured, used, and licensed by or for the Government for governmental purposes without the payment to us for any royalty thereon.

This invention relates generally to an improved coupling device for releasably connecting elements of a system under tension load. More particularly, the invention relates to a coupling device for releasably connecting an extraction parachute to a cargo which is being airdropped from an aircraft and for transferring the force applied by the extraction parachute from the cargo to the deployment means for the recovery parachute system.

In the airdrop of military equipment, it is necessary to provide means for extraction of the cargo from the aircraft and other means for safely lowering the cargo to the ground. The first function is usually performed by an extraction parachute and the second by a recovery parachute or a system of recovery parachutes. The extraction parachute is deployed behind the aircraft and applies a tension force to the cargo sufficient to pull the cargo out of the aircraft through an opening in the rear of the aircraft. As soon a the cargo is sufficiently clear of the aircraft to avoid entanglement of the recovery parachute as it is being deployed, the extraction parachute is released from the cargo. The force exerted by the extraction parachute is transferred to the recovery parachute thereby producing rapid deployment of the recovery parachute system which reduces the rate of fall of the cargo to a point where energy-absorbing materials placed under and around the cargo will adequately protect it from damage caused by impact with the ground. In the airdrip of cargoes weighing up to 50,000 pounds, the extraction parachute may develop forces in tension up to about one and one-half times the cargo weight for extraction of the load from the aircraft; and release of such forces creates serious problems, particularly where it is desirable to use the coupling device in repeated airdrops.

It has become customary to employ a three-point connecting link in aerial delivery systems of this type. The cargo is attached at one point, the extraction parachute at a second point, and the deployment system for the recovery parachute at the third point of the connecting link. When cargoes are airdropped, high energy must be dissipated at the moment of uncoupling the connecting link from the cargo. It has been necessary to employ bulky and heavy releasable couplings for this purpose since most of this energy has been absorbed within the coupling. One method of absorbing this energy has been to incorporate within the coupling a very heavy rotatable hook-type latch which, upon release from the tension force being exerted by the extraction parachute, absorbs the energy by rotating within the coupling. This system had the disadvantage that substantially all of the force was concentrated on the latch of the coupling, which therefore had to be made large and heavy enough to withstand forces in the range of 60,000 pounds or more without breaking. This difficulty was overcome for airdrop cargo loads up to about 35,000 pounds by a releasable coupling described in Frost et al U.S. Pat. No. 3,425,739. However, airdrop loads above 35,000 pounds produced too much impact within the latch mechanism of this releasable coupling and only limited repeated use of the coupling became possible with loads above 35,000 pounds because of damage resulting from impacts of the parts which controlled the release of the latch against each other and against the body of the latch assembly.

We have now produced an improved releasable coupling which essentially eliminates high impact forces within the latch mechanism of the releasable coupling by dissipating the energy released within the latch mechanism when the latch is unlocked and the three-point linkage separates from the latch and from the load. This dissipation of the energy released within the latch mechanism is accomplished by allowing a generally circularly shaped lock link to rotate freely until all of the energy has been dissipated through bearing friction and air resistance.

It is, therefore, an object of the present invention to provide a novel and improved coupling device for releasably connecting elements of a system under tension load.

Another object is to provide an improved coupling device for releasably connecting elements of a system under tension load and for transferring the force being applied to the load to another element of the system.

A further object is to provide an improved coupling device for releasably connecting a heavy airdrop cargo to an extraction parachute and for transferring the force produced by the extraction parachute to the deployment line of a recovery parachute system for the cargo.

Other objects and advantages will be apparent from the following description of one embodiment of the invention, and the novel features will be particularly pointed out hereinafter in connection with the appended claims.

In the accompanying drawings:

FIG. 1 is a top plan view of a coupling device constructed in accordance with this invention.

FIG. 2 is a side elevation of the same looking at the coupling device from the right side thereof as shown in FIG. 1.

FIG. 3 is a side elevation, partly in section, with portions broken away, of the coupling device shown in FIGS. 1 and 2, the right side plates of the latch assembly and the link assembly having been removed, showing the internal parts of the coupling device and their relationships when the latch assembly and the link assembly are connected together and the latch assembly is locked in place, as would be the case during extraction of a cargo from an aircraft.

FIG. 4 is a side elevation, similar to FIG. 3, showing the internal parts of the coupling device and their relationships immediately following unlocking of the latch assembly.

Figure 5:
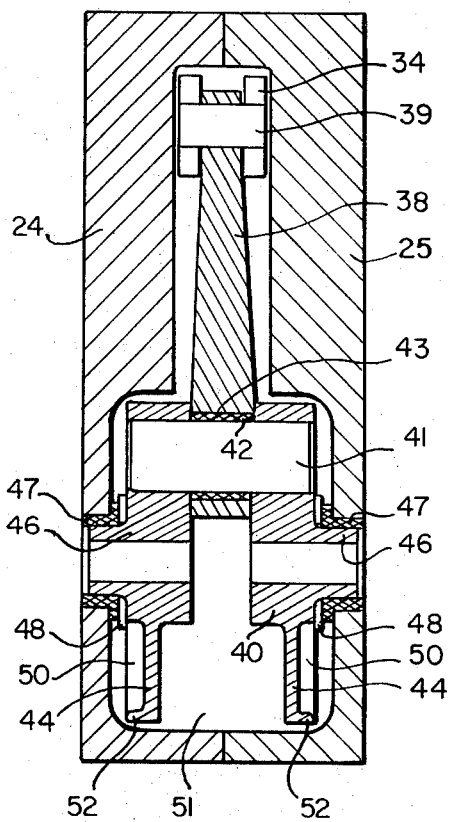

FIG. 5 is a partial cross-sectional view of the toggle linkage portion of the latch assembly in its assembled form as in FIGS. 1 and 2 taken through the plane of line 5—5 as shown in FIG. 3 for the sake of convenience.

Figure 6:
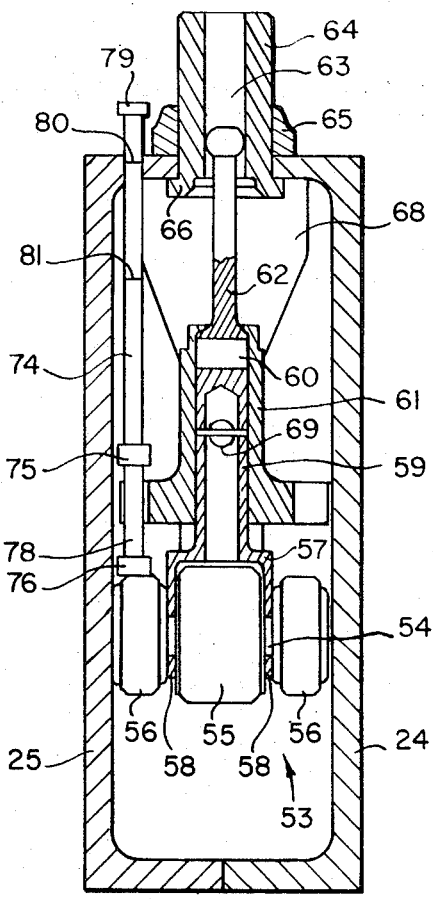

FIG. 6 is a partial cross-sectional view of the cable connector and slider portions of the assembled latch assembly as shown in FIGS. 1 and 2 taken through the plane of line 6—6 as shown in FIG. 3 for the sake of convenience.

Figure 7:
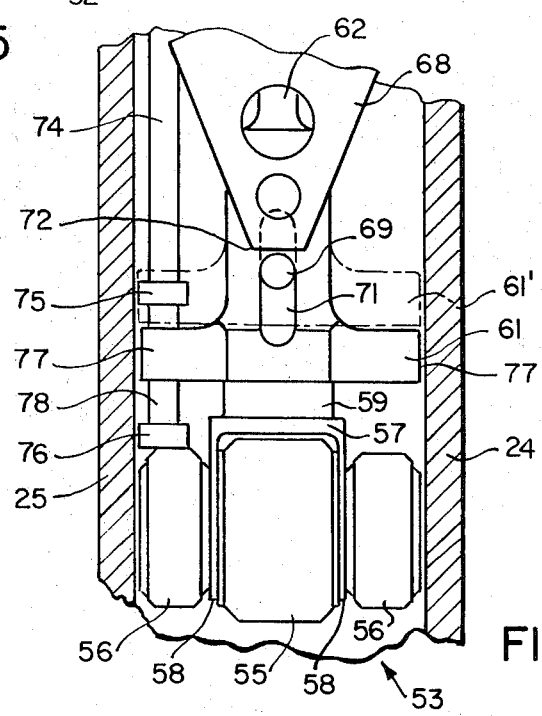

FIG. 7 is a view in elevation and partially in section of the slider, roller assembly, and leaf spring portions of the assembled latch assembly as shown in FIG. 6, with portions broken away.

In the illustrated embodiment of the invention, the coupling device comprises a link assembly 10 and a latch assembly 11, to which the link assembly is releasably connected. The link assembly comprises a pair of spaced parallel body members 12 and 13 connected by three spaced cylindrical bolts 14, 15 and 16. Bolt 14 is provided with freely rotatable cylindrical sleeve 17 for connecting the link assembly with webbing element 18 of a system under tension load, for example, a tension load imparted by an extraction parachute (not shown). Pin 15 is provided with freely rotatable cylindrical sleeve 19 for connecting the link assembly with webbing element 20, which may be connected to the deployment line of a recovery parachute system (not shown) attached to a cargo being airdropped. Pin 16 is provided with a freely rotatable cam 21 mounted thereon which is adapted to be releasably connected to the latch assembly, as will be more particularly pointed out hereinafter. Bolts 14, 15 and 16 are each secured to body members 12 and 13 by means of a nut 22.

Latch assembly 11 comprises means for releasably connecting the link assembly to the cargo while it is in the aircraft and until the cargo has been fully extracted from the aircraft by the action of the extraction parachute in applying a high force to the link assembly. The latch assembly is operable to disconnect the link assembly at a predetermined time or distance from the exit of the aircraft in a manner to be described hereinafter. More particularly, the latch assembly comprises a latch assembly body 23 which comprises a pair of side plates 24 and 25 held together by threaded bolts 26, 27 and 28. Bolts 27 and 28 are larger than bolts 26 and are high-tensile bolts to withstand the bending loads which may be applied in certain situations when the load is offset to one side, applying a prying load due to bending in the side plates when this kind of action occurs. Side plates 24 and 25 are conformed to provide a housing for movable latch means adapted to engage the rotatable cam of the link assembly to prevent rotation of the cam and means for disengaging the latch means from the cam to render the cam free to rotate.

One end of the latch assembly body is provided with a hole 29 passing therethrough for attaching a clevis 30, which is secured to the latch assembly body by bolt 31 passing through hole 29 and held in place by nut 32. The clevis 30 may be connected to the cargo in any suitable manner, as by webbing, a clevis hook, or otherwise. The other end of the latch assembly body defines a hook portion 33 which is conformed to engage a portion of the rotatable cam 21 of the link assembly in a manner to be described. The hook portion imparts a rotating moment to the cam 21 when a tension load is applied longitudinally of the coupling device.

A movable latch member 34 and operating mechanism therefor are mounted within the latch assembly body 23. These parts and their interrelationships when locked and unlocked are shown in FIGS. 3 and 4 respectively. Latch member 34 is pivotally mounted within the latch assembly body 23 on pin 35 spaced from hook portion of the latch assembly body so that cam 21 fits between the hook portion and the latch member. Cam engaging surface 36 is formed at one end of the latch member for engaging a portion of rotatable cam 21 in a manner to be described to prevent rotation thereof as long as the latch member is maintained in the locked or closed position bearing against the cam as shown in FIG. 3. Latch member 34 is pivotally connected at its other end to reciprocative toggle linkage 37, which comprises connecting rod 38 connected by pin 39 to latch member 34 and lock link 40 to which the other end of the connecting rod is pivotally connected adjacent to the periphery of the lock link by pin 41. Pin 41 passes through a bronze bushing 42 which is fitted in hole 43 in the other end of connecting rod 38.

Lock link 40 comprises a pair of generally circularly shaped wheel-like elements 44 rotatably mounted between side plates 24 and 25 on pin 45 which passes through each centrally disposed hub 46 formed on each wheel-like element of the lock link. Hubs 46 are journalled in bronze bushings 47 which provide bearing surfaces on which hubs 46 bear when the lock link rotates. Washers 48 are placed over hubs 46 and serve to space the outer edges of lock link 40 from the inner surfaces of bushings 47. Lock link 40 has a concavely cut out portion or notch 49 extending over a portion of its periphery which serves a purpose to be described in connection with the locking and unlocking of the latch assembly. Wheel-like members 44 of lock link 40 are cast or machined so that certain hollow portions 50 and 51 are present in the assembled lock link 40 to reduce the weight thereof as much as possible while retaining adequate strength where it is needed in performing the function of the lock link as part of the toggle linkage. Thus, over a large portion of its periphery lock link 40 is characterized by spaced apart flanged edges 52.

The latch assembly also comprises roller assembly 53 which at the bottom of its stroke engages lock link 40 in notch 49 to maintain the toggle linkage in its locking position so that latch 34 is maintained in its locked position thereby preventing cam 21 from rotating and becoming disconnected from latch assembly 11. Roller assembly 53 as shown in FIGS. 6 and 7 comprises an assembly of three roller bearings rotatably mounted on shaft 54 with the middle roller bearing 55 having a slightly greater external diameter than the two outer roller bearings 56 so that roller bearing 55 rolls in contact with the inner surfaces of side plates 24 and 25 when the roller assembly is moved up or down to disengage or engage with lock link 40 while roller bearings 56 are maintained out of contact with the inner surfaces of side plates 24 and 25 but bear upon the outer surfaces of wheel-like members 44 of lock link 40 within the notch 49 thereof. Hence, when roller bearings 55 and 56 are at the bottom of their stroke, outer roller bearings 56 are inserted and held in notch 49, thus preventing rotation of lock link 40; and when roller assembly 53 is moved upwardly, roller bearing 55 rotates counterclockwise while roller bearings 56 rotate clockwise until they escape from notch 49, whereupon lock link 40 is free to rotate in a counterclockwise direction. This action unlocks latch member 34, which pivots as also does connecting rod 38, the position of both when latch member 34 is unlocked being shown in FIG. 4.

Shaft 54 and roller bearings 55 and 56 are supported by roller fork 57, the two legs 58 of the fork straddling middle roller bearing 55. The upper cylindrical portion or shaft 59 of roller fork 57 to which legs 58 of the roller fork are attached is coaxial with and extends into a central opening 60 in a slider 61 which is connected at its top to cable connector 62. Cable connector 62 moves up or down within the central bore 63 of fitting 64 which is held clamped to the top of the latch assembly by means of internally threaded nut 65 cooperating with external threads on fitting 64 adjacent to its lower end. The lower end of fitting 64 has a flange 66 thereon which supports an inverted substantially U-shaped leaf spring 67 having two legs 68 which serve as locking means in cooperation with locking pin 69 for maintaining roller assembly 53 at the bottom of its stroke engaging lock link 40 in notch 49 and maintaining the lock link in its locking position. Pin 69 passes through shaft 59 of roller fork 57 and extends outwardly at both ends 70 of the pin through slots 71, one of which is in one sidewall of slider 61 and another is in the opposite sidewall of slider 61. Slots 71 are of such length that a ⅜-inch relative movement between the slider and the shaft 59 of the roller fork 57 is permitted to occur as the cable connector 62 is pulled upwardly, pulling the slider upwardly along with it. Reference numeral 61″ represents in phantom the position of the slider after the ⅜-inch movement upward. The outside surfaces of the slider are so contoured that as the slider is pulled upward and the legs 68 of the leaf spring 67 are forced outwardly by the slider until upon completion of the ⅜-inch upward movement of the slider the slots bottom out at the ends 70 of pin 69 and the ends 72 of the legs of the leaf spring pass over the ends 70 of the locking pin 69; thus, further upward movement of the cable connector 62 produces an upward movement of the roller assembly and unlocking of lock link 40. The roller assembly is thus pulled upwardly about five-eighths-inch to unlock lock link 40. With only rolling friction produced by roller bearings 55 and 56 involved, a positive pull of only 5 to 15 pounds is required to disengage the roller bearings 56 from the notch 49 of lock link 40 even when tension loads as high as 75,000 pounds, as produced by extraction chute force to extract a 50,000 pound load from an aircraft are produced, and such forces are being transmitted through the three-point link assembly, the cam thereof and the latch member 34 and toggle linkage 37 of the latch assembly.

As soon as roller bearings 56 are disengaged from notch 49, thereby unlocking lock link 40, the toggle linkage, which is slightly offset from dead center, collapses operating much in the manner of the crankshaft of a single-cylinder engine. The rotatable cam 21 then rotates out of engagement by hook portion 33 of the latch assembly during the first reciprocative stroke of latch member 34 produced by the counterclockwise rotation of lock link 40 and the downward pull of connecting rod 38. The extraction force is immediately thereafter transferred to the deployment line of a recovery parachute system (not shown) attached to the cargo that has been extracted from an aircraft. At the same time the energy stored up in the latch assembly by the pull of the extraction parachute on the link assembly and the latch assembly is dissipated by the rotation of lock link 40 accompanied by the reciprocative motion of connecting rod 38 and latch member 34, the energy being used up gradually over a substantial period of time by bearing friction at four bearing interfaces and by air resistance without any sudden impacting of parts of the latch assembly being involved, as was the case in prior releasable couplings.

It is essential that there be positive locking of the roller assembly with the roller bearings 56 inserted in the notch 49 of lock link 40 when the rotatable cam 21 is properly fitted into the hook portion 33 of the latch assembly and locked therein by latch member 34. Otherwise, any vibration or jerking of the system might result in premature unlocking of the latch and separation of the load from the extraction parachute before complete removal of the load from the aircraft. As described above, this positive locking is produced by the cooperation of leaf spring 67 with locking pin 69.

The latch assembly is unlocked from the link assembly by the pull of the control cable 73 which is connected to a triggering device (not shown) which is activated the moment the cargo leaves the aircraft under the pull of the extraction parachute. It would be impractical to have a direct connection of the roller assembly to the control cable 73 which actuates cable connector 62 since such control cables in time elongate somewhat or otherwise lose some of their manufacturing tolerances. The incorporation of the slider 61 in the system permits the making of the necessary adjustments in control cable length while still insuring positive locking of the roller assembly by the leaf spring 67 and locking pin 69.

The latch assembly also comprises a cylindrically shaped pushrod 74, as shown in FIGS. 6 and 7, which serves several purposes. The pushrod is provided with spaced apart flange portions 75 and 76 which are of such diameters as not to pass between ears 77 on slider 61 while the intervening cylindrical portion 78 of the pushrod is free to move up or down between ears 77 and thus accomplish locking of the latch assembly by pushing the pushrod down against roller 56 or pulling the pushrod up sufficiently to raise the slider and unlock leaf spring 67. The upper end of the pushrod 79 extends outside of the latch assembly and is flanged to provide a grip for holding the pushrod as it is being raised or a surface to use in pushing the pushrod down to lock the latch assembly.

Another purpose served by the pushrod is in determining whether a control cable of suitable length when fully extended has been connected to the cable connector. The pushrod is provided with indicia 80 and 81 separated by about one-half-inch near the top of the pushrod such that when the pushrod is pushed down and the roller bearings 56 are locked into the notch 49 of lock link 40, both of the indicia are out of sight inside of the latch assembly. The proper position of the slider 61 is then checked by pulling up on the pushrod. If the lower indicia 81, as well as upper indicia 80, is visible outside of the latch assembly, the slider is riding too high for safety and there would be too much danger of accidental unlocking of the latch assembly prior to the time when it is purposely unlocked by pulling on the control cable, cable connector 62, and slider 61. The portion of the pushrod between indicia 80 and 81 may be painted or otherwise marked so that when the pushrod is pushed down and the roller bearings 56 are locked into the notch 49 of the lock link, all of the painted portion between indicia 80 and indicia 81 is out of sight inside of the latch assembly; and when the pushrod is pulled up, if all of the painted portion is visible outside of the latch assembly, it is apparent that the slider is riding too high for safety and that an adjustment of the control cable and thereby the position of the slider needs to be made.

In the use of the coupling device of the invention, when heavy loads, e.g., of the order of 35,000 to 50,000 pounds, are to be airdropped from an aircraft, the latch assembly is connected to a cargo (not shown) in an aircraft by means of clevis 30 and webbing or other means. The link assembly containing the rotatable cam is locked in connection with the latch assembly as shown in FIG. 2 prior to the application of a tension load to the link assembly by unlocking the lock link, lifting the latch member 34 sufficiently to position the rotatable cam 21 in the hook portion 33, rotating the latch member until cam engaging surface 36 engages the rotatable cam, which results in rotation of the lock link until the notch is in position to receive the roller bearings 56, then cocking the triggering device, thereby locking the latch assembly. An extraction parachute (not shown) is connected to the link assembly by means of webbing element 18, which is snubbed around rotatable cylindrical sleeve 17. The link assembly is similarly connected by means of webbing element 20, snubbed around rotatable cylindrical sleeve 19, to the deployment means for one or more recovery parachutes (not shown). It is to be understood that webbing element 20 will be of sufficient length to remain slack until the link assembly is released from the latch assembly.

When the cable is pulled up by the triggering device, cable connector 62 pulls slider 61 up. This causes legs 68 of the leaf spring to be raised sufficiently to pass over the ends 70 of locking pin 69, thus permitting the pull on the cable to pull roller bearings 56 out of engagement with notch 49 of the lock link 40, freeing the lock link for rotation. The extraction force acting through the link assembly causes the rotatable cam to escape from the latch assembly by forcing the latch member 34 up, thus rotating lock link 40. The energy produced is used up in rotational friction and air resistance both in the link assembly by free rotation of rotatable cam 21 and in the latch assembly by the rotation of lock link 40 and the reciprocative movements of latch member 34 and connecting rod 38 in cooperation with lock link 40.

Following disengagement of the rotatable cam from the latch assembly, the force being exerted by the extraction parachute is transferred to the deployment lines for the recovery parachute through webbing element 20. The latch assembly remains attached to the cargo and descends to earth along with it. The link assembly remains connected to the extraction parachute and descends along with the housing for the recovery parachute, which was removed during deployment thereof. Both the latch assembly and the link assembly can be recovered for use in subsequent airdrops.

Although the invention has been described in terms of transferring the force exerted by an extraction parachute from the cargo to the recovery parachute deploying means, it is to be understood that it is not limited to such usage. For example, if it is desired to deliver a cargo by free fall, the coupling device may be employed in the extraction of the cargo from an aircraft and then in disconnecting the extraction parachute from the cargo. It may also be employed in other situations for simply uncoupling a load from a source of tension acting upon the load. The invention is, therefore, useful in hauling loads on the ground or on water and uncoupling the load from the hauling force at a preselected time, as well as in airdrop operations.

The force transfer device of this invention has the advantage over the prior art force transfer devices for use with heavy loads in that it eliminates impacts of parts within the latch assembly which prior to the invention resulted when separation of the extraction parachute from the load occurred. Consequently, the coupling device of the invention is reusable for hundreds of airdrops of cargoes weighing 50,000 pounds or more since the large amounts of energy released upon disconnection of the source of high tension from the load after it is extracted from the aircraft is used up in rotation of the lock link and reciprocating movement of the latch and connecting rod. The heat generated at the bearing points is rapidly conducted away and dissipated without damage to the parts of the latch assembly. The latch assembly and the link assembly must, of course, have sufficient strength to withstand the tension required in initiating, as well as completing the pulling of such heavy loads out of an aircraft.

It will be understood that various changes in the details, materials and arrangements of parts, which have been herein described and illustrated in order to explain the nature of the invention, may be made by those skilled in the art, within the principle and scope of the invention as expressed in the appended claims.

We claim:

1. In a coupling device for releasably connecting elements of a system under tension load comprising in combination
   a link assembly and
   a latch assembly,
   said link assembly comprising means for connecting same to one of said elements of said system and rotatably mounted cam means spaced from said connecting means,
   said latch assembly comprising means for connecting same to another of said elements of said system, a hook portion conformed to engage said rotatable cam means of said link assembly and to impart a rotating moment to said cam means when a tension load is applied longitudinally of said coupling device, said moment tending to dislodge said cam means from said hook portion, movable latch means adapted to releasably engage said cam means to prevent rotation thereof when said cam means is engaged in said hook portion and means for releasably locking said latch means in engagement with said cam means,
   that improvement wherein said means for releasably locking said latch means in engagement with said cam means comprises a toggle linkage, a freely rotatable lock link, and means for releasably locking said lock link against rotation, said toggle linkage being connected to said lock link at a point spaced from the axis of rotation thereof;
   whereby the energy created in the latch means by the release of said rotatable cam means is dissipated by free rotation of said lock link and the resulting reciprocative movement of said toggle linkage.

2. A coupling device according to claim 1, wherein said rotatable lock link is generally circular, a portion of the peripheral surface of said lock link having a concave configuration for mating with said means for releasably locking said toggle linkage.

3. A coupling device according to claim 2, wherein said means for releasably locking said toggle linkage comprises roller bearing means for mating with said rotatable lock link at said concave portion to maintain said toggle linkage in locked position, whereby said latch means is maintained in locked position.

4. A coupling device according to claim 3, wherein said means for releasably locking said toggle linkage comprises a fork, a shaft, and a slider, said roller bearing means being mounted on said fork, said fork being attached to said shaft, and said shaft being movable by said slider, whereby said roller bearing means is moved out of locking engagement with said rotatable rock link at said concave portion thereof.

5. A coupling device according to claim 4, wherein said means for releasably locking said toggle linkage comprises a leaf spring locking means for locking said shaft, said fork, and said roller bearing means in locking position while said slider remains free to move, said leaf spring locking means being mounted within said latch assembly, a locking pin being fixedly mounted on said shaft and passing through slotted openings in the sidewalls of said slider, said leaf spring locking means in combination with said locking pin being adapted to maintain said roller bearing means in locking engagement with said rotatable lock link at said concave portion thereof until said slider is purposely raised sufficiently to cause said leaf spring locking means to become disengaged from said locking pin, thereby permitting said roller bearing means to move out of locking engagement with said rotatable lock link.

6. A coupling device according to claim 5, wherein said latch assembly comprises movable means for visually indicating when said slider is properly positioned to permit locking of said shaft by said leaf spring locking means.

7. A coupling device according to claim 6, wherein said movable means for visual indication is a cylindrically shaped pushrod, said pushrod being loosely connected to said slider, one end of said pushrod extending outside of said latch assembly and having indicia thereon which visually indicate when said slider is properly positioned to permit locking of said shaft by said leaf spring locking means.

* * * * *